United States Patent
Ohashi (10) Patent No.: US 9,475,338 B2
(45) Date of Patent: Oct. 25, 2016

(54) TEXTILE PRINTING METHOD

(71) Applicant: Seiko Epson Corporation, Tokyo (JP)

(72) Inventor: Masakazu Ohashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 691 days.

(21) Appl. No.: 13/778,698

(22) Filed: Feb. 27, 2013

(65) Prior Publication Data

US 2013/0224447 A1 Aug. 29, 2013

(30) Foreign Application Priority Data

Feb. 28, 2012 (JP) .................. 2012-041231

(51) Int. Cl.
| | |
|---|---|
| B44C 1/16 | (2006.01) |
| B29C 65/02 | (2006.01) |
| B29C 65/52 | (2006.01) |
| B32B 37/06 | (2006.01) |
| B32B 38/14 | (2006.01) |
| B44C 1/14 | (2006.01) |
| B32B 3/10 | (2006.01) |
| B32B 15/14 | (2006.01) |
| D06Q 1/04 | (2006.01) |
| D06Q 1/12 | (2006.01) |
| B32B 37/26 | (2006.01) |

(52) U.S. Cl.
CPC . B44C 1/14 (2013.01); B32B 3/10 (2013.01); B32B 15/14 (2013.01); D06Q 1/04 (2013.01); D06Q 1/12 (2013.01); *Y10T 428/2481* (2015.01)

(58) Field of Classification Search
CPC ... B32B 15/14; B32B 3/10; Y10T 428/2481; B44C 1/1729; B44C 1/14; D06Q 1/04; D06Q 1/12

USPC .................................. 156/233, 277
See application file for complete search history.

(56) References Cited

U.S. PATENT DOCUMENTS

| | | | | |
|---|---|---|---|---|
| 2,681,867 | A | * 6/1954 | Miller | ........... D06Q 1/08 427/272 |
| 2,734,001 | A | * 2/1956 | Mecklenburgh et al. | ....... D06M 11/155 427/381 |
| 3,772,078 | A | * 11/1973 | Polichette | ........... G03C 1/64 205/187 |
| 4,172,702 | A | * 10/1979 | Bernier | ........... B05D 7/14 427/195 |
| 4,942,083 | A | * 7/1990 | Smith, Jr. | ........... C23C 28/00 427/407.1 |

(Continued)

FOREIGN PATENT DOCUMENTS

| | | |
|---|---|---|
| CA | 2136184 A1 | 10/1994 |
| JP | 2001-310597 A | 11/2001 |

(Continued)

OTHER PUBLICATIONS

English translation of JP2009-226863.*

(Continued)

*Primary Examiner* — Sonya Mazumdar
(74) *Attorney, Agent, or Firm* — Nutter McClennen & Fish LLP; John J. Penny, Jr.; Alex Nagorniy (57) ABSTRACT

A textile printing method includes coating a printing surface of a fabric with a pretreatment liquid; ejecting an adhesive liquid onto the printing surface to form an adhesive layer, after the coating of the printing surface; and transferring metallic foil onto the adhesive layer by bringing a sheet, on which the metallic foil is formed, into contact with the adhesive layer.

6 Claims, 5 Drawing Sheets

(56) References Cited

U.S. PATENT DOCUMENTS

| | | | | |
|---|---|---|---|---|
| 5,084,306 | A * | 1/1992 | McLellan et al. | D06M 11/64 427/354 |
| 5,798,147 | A * | 8/1998 | Beck | C08F 20/28 252/299.5 |
| 5,807,608 | A * | 9/1998 | O'Dell et al. | B44C 5/0476 427/195 |
| 6,190,830 | B1 * | 2/2001 | Leon | B41C 1/1041 101/467 |
| 2004/0180291 | A1 * | 9/2004 | Collins | B41C 1/1008 430/302 |
| 2009/0301382 | A1 * | 12/2009 | Patel | G01D 3/10 116/201 |
| 2010/0263109 | A1 * | 10/2010 | Noerenberg | D06M 11/83 2/456 |
| 2012/0058697 | A1 * | 3/2012 | Strickland | B82Y 15/00 442/59 |
| 2012/0295119 | A1 * | 11/2012 | David | A63B 53/007 428/447 |
| 2013/0000830 | A1 | 1/2013 | Green | |

FOREIGN PATENT DOCUMENTS

| | | | | |
|---|---|---|---|---|
| JP | 2009-226863 A | | 10/2009 | |
| JP | WO 2011059086 A1 * | | 5/2011 | B29C 43/203 |
| JP | EP 2660387 A3 * | | 5/2015 | B44C 1/14 |
| WO | 94/24360 A2 | | 10/1994 | |
| WO | 03/106763 A1 | | 12/2003 | |

OTHER PUBLICATIONS

English translation of JP2001-310597.*
English translation of WO9424360.*
English translation of WO2011059086.*

* cited by examiner

PRETREATMENT SOLUTION

(HEATING AND PRESSING)

(HEATING AND PRESSING)

FIG. 11

TEXTILE PRINTING METHOD

The entire disclosure of Japanese Application No.: 2012-041231 filed on Feb. 28, 2012 is expressly incorporated by reference herein.

BACKGROUND

1. Technical Field

The present invention relates to a textile printing method.

2. Related Art

As a method of forming a metallic texture image, a recording method of ejecting an adhesive liquid onto a recording medium with an ink jet method to form an adhesive layer; bringing a sheet, on which metallic foil (for example, an aluminum deposited film) is formed, into contact with the adhesive layer; and transferring the metallic foil onto a medium (adhesive layer), is known (for example, refer to JP-A-2009-226863).

However, when the recording medium is a fabric (for example, T-shirt), the adhesive liquid permeates the fabric. Therefore, it is difficult to satisfactorily transfer the metallic foil onto the fabric.

SUMMARY

An advantage of some aspects of the invention is to provide a textile printing method in which metallic foil is satisfactorily transferred onto a fabric.

According to an aspect of the invention, there is provided a textile printing method including: coating a printing surface of a fabric with a pretreatment liquid; ejecting an adhesive liquid onto the printing surface to form an adhesive layer, after the coating of the printing surface; and transferring metallic foil onto the adhesive layer by bringing a sheet, on which the metallic foil is formed, into contact with the adhesive layer.

Other characteristics of the invention will be clarified from the description of this specification and the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

At least the following matters will be clarified from the description of this specification and the accompanying drawings.

Clarified is a textile printing method including a pretreatment step of coating a printing surface of a fabric with a pretreatment liquid; an adhesive liquid ejecting step of ejecting an adhesive liquid onto the printing surface to form an adhesive layer, after the pretreatment step; and a metallic foil transfer step of transferring metallic foil onto the adhesive layer by bringing a sheet, on which the metallic foil is formed, into contact with the adhesive layer.

According to such a textile printing method, the adhesive liquid aggregates on a surface of a fabric by coating the fabric with the pretreatment liquid. As a result, even when a recording medium is a fabric, metallic foil can be satisfactorily transferred onto the recording medium.

The textile printing method may further include an undercoat layer forming step of ejecting an undercoat ink onto the printing surface, coated with the pretreatment liquid, to form an undercoat layer, before the adhesive liquid ejecting step.

According to such a textile printing method, chromogenic properties can be improved irrespective of the color of a fabric.

In the textile method, it is preferable that the undercoat ink be white ink.

According to such a textile printing method, a white undercoat layer can be formed on a fabric. As a result, the chromogenic properties of an image (metallic foil), formed on the white undercoat layer, can be further improved.

In the textile printing method, it is preferable that the metallic foil transfer step include a heating step of heating the sheet and the fabric.

According to such a textile printing method, when a component of the adhesive liquid is a thermoplastic resin, the metallic foil can be transferred onto the recording medium by heating it.

In the textile printing method, it is preferable that the heating step be performed with a heat press method.

According to such a textile printing method, the metallic foil can be more reliably transferred onto the recording medium.

In the textile printing method, it is preferable that the pretreatment liquid contain a polyvalent metal salt.

According to such a textile printing method, the adhesive liquid can be prevented from permeating the fabric.

In the textile printing method, it is preferable that the adhesive liquid contain an adhesive compound having an anionic group.

According to such a textile printing method, the adhesive compound having an anionic group is highly reactive with the pretreatment liquid (a polyvalent metal salt or an organic acid). As a result, the adhesive liquid (adhesive compound) can effectively aggregate on a surface of the fabric coated with the pretreatment liquid.

Hereinafter, some embodiments of the invention will be described. The embodiments described below are examples of the invention.

First Embodiment

Metallic Image

As a method of forming a metallic texture image, a method of ejecting an adhesive liquid onto a recording medium with an ink jet method to form an adhesive layer; bringing a sheet, on which metallic foil (for example, an aluminum deposited film) is formed, into contact with the recording medium (adhesive layer); and transferring the metallic foil onto the recoding medium (adhesive layer), is known. However, when the recording medium is a fabric (for example, T-shirt), the adhesive liquid permeates the fabric. Therefore, it is difficult to satisfactorily transfer the metallic foil onto the fabric. When a metallic ink is ejected to the fabric with an ink jet method to form an image, it is difficult to obtain metallic gloss for some reasons: for example, the roughness (concavity and convexity) of a surface of a fabric is large; and a smooth layer is not obtained due to a resin component of the ink.

Therefore, in this embodiment of the invention, when metallic foil is transferred to a fabric to form a metallic image, conditions are improved as follows.

Texture Printing Conditions

1. Ink Jet Recording Apparatus

In this embodiment, for example, when an adhesive layer described below is formed, a recording apparatus using an ink jet method (ink jet recording apparatus) is used. Examples of the ink jet method include a method (piezoelectric method) in which pressure and a printing information signal are simultaneously applied to ink using a piezoelectric element to eject ink droplets and perform recording; a method in which an ink is heated for generating foam with a microelectrode in accordance with a printing information signal to eject ink droplets and perform recording (thermal jet method); a method in which an intense electric field is applied between nozzles and an acceleration electrode disposed in front of the nozzles to continuously eject ink droplets from the nozzles, and a printing information signal is applied to deflecting electrodes while the ink droplets are present between the deflecting electrodes, or a method in which the ink droplets are ejected in accordance with a printing information signal without being deflected (electrostatic attraction method); and a method in which pressure is applied to ink using a small pump, nozzles are mechanically vibrated by a crystal oscillator and the like, and thus ink droplets are forcibly ejected.

The above-described recording methods can be performed using an ink jet recording apparatus including an ink jet head, a main body, a tray, a head driving mechanism, and a carriage. To the head described herein, an ink cartridge, which accommodates ink sets of, for example, at least four colors including cyan, magenta, yellow, and black, may be mounted so as to perform full-color printing. In addition, in the embodiment, at least one of ink cartridges is filled with an adhesive liquid described below. In addition, the other ink cartridges may be filled with normal ink or the like. The ink jet recording apparatus includes a dedicated control board (controller) and thus can control the ink ejection timing of the head, the scanning of the head driving mechanism, the movement of a recording medium, and the like.

2. Recording Medium

In the embodiment, a fabric is used as a recording medium. As the fabric, any fabric which is used in the related art may be used, and examples thereof include various kinds of fabrics such as cotton, silk, hemp, rayon, acetate, nylon, polyester fiber; and mixed fabrics of two or more kinds of fabrics.

3. Pretreatment Liquid

As described below, the texture printing method according to the embodiment includes a pretreatment step of ejecting a pretreatment liquid onto a fabric. The pretreatment liquid can be ejected using a well-known unit, and examples thereof include various coating units, spraying units, and ink jet printing units.

It is preferable that the pretreatment liquid for fabric contain at least one kind of polyvalent metal salt or at least one kind of organic acid. Hereinafter, components included in the pretreatment liquid will be described.

Examples of the polyvalent metal salt included in the pretreatment liquid include salts of alkali earth metals such as Ca and Mg, and specific examples thereof include $CaCl_2$, $Ca(NO_3)_2$, $Ca(OH)_2$, $(CH_3COO)_2Ca$, $MgCl_2$, $Mg(OH)_2$, and $(CH_3COO)_2Mg$. Among these, salts of Ca are preferable. Examples of the organic acid included in the pretreatment liquid include an acetic acid, a citric acid, a propionic acid, and a lactic acid. Among these, an acetic acid is preferable. The content of the polyvalent metal salt or the organic acid in the pretreatment liquid is not particularly limited, and is, for example, about 0.1% by mass to 40% by mass.

In addition, the pretreatment liquid contains water as a medium. Optionally, the pretreatment liquid may contain an organic solvent. In this case, as water and the organic solvent, examples described below in the description of an ink composition may be used.

Furthermore, the pretreatment liquid may contain a resin having a glass transition temperature of 0° C. or lower from the viewpoint of obtaining an ink jet printed material having superior wear resistance and flexibility. The resin is not particularly limited as long as it does not aggregate or precipitate when being mixed with the metal salt.

4. Adhesive Composition

In the embodiment, an adhesive composition (hereinafter, also referred to as an "adhesive liquid") is attached onto a recording medium (fabric) with an ink jet method. Examples of the adhesive composition to be attached onto a recording medium with an ink jet method include the following examples. The adhesive composition contains at least an adhesive compound.

4.1. Adhesive Compound

Examples of the adhesive compound included in the adhesive composition include acrylic, urethane-based, vinyl chloride-based, and vinyl acetate-based monomers, oligomers, and polymers which are generally used as an adhesive. Specific examples thereof include polyester-based resins, polyacrylate-based resins, polyvinyl acetate-based resins, vinyl-based resins such as polyvinyl chloride resin and polyvinyl alcohol resin, polyvinyl acetal-based resins such as polyvinyl acetoacetal and polyvinyl butyral, polyether-based resins, polyurethane-based resins, styrene acrylate-based resins, polyacrylamide-based resins, polyamide-based resins, polystyrene-based resins, polyethylene-based resins, polypropylene-based resins, polyvinyl pyrrolidone-based resins, and modified products thereof. In addition, examples of the adhesive compound include adhesive materials including natural resins such as rosins, gelatinized starches, animal glues, and various sugars and modified products thereof.

Among the above-described adhesive compounds, an adhesive compound having an anionic group, which becomes dissociated in the water phase and is negatively charged, is preferable. Examples of the anionic group include a carboxyl group and a sulfone group. In particular, the adhesive compound having an anionic group is high reactive with the polyvalent metal salt or the organic acid included in the pretreatment liquid. Therefore, the adhesive compound can effectively aggregate on a surface of a fabric.

Specific examples of the adhesive compound include vinyl acetate-based emulsion (Tg=−2° C.); vinyl chloride-based emulsion (Tg=42° C.; for example, vinyl chloride-based adhesives available from Nissin Chemical Industry Co., Ltd.); MOWINYL 727 (Tg=5° C.), MOWINYL 718A (Tg=−6° C.), MOWINYL 752 (Tg=15° C.), MOWINYL 7525 (Tg=−16° C.), and MOWINYL 745 (Tg=21° C.) (for example, acrylic adhesives available from Nippon Synthetic Chemical Industry Co., Ltd.); SUPERFLEX 840 (Tg=5° C.) and SUPERFLEX 500M (Tg=−39° C.) (for example, urethane-based adhesives available from Dai-Ichi Kogyo Seiyaku Co., Ltd.); TAKELAC W-6021 (Tg=60° C.; manufactured by Mitsui Chemicals Inc., urethane resin); and PERMARINE UA-150 (manufactured by Sanyo Chemical Industries Ltd., polyether-based urethane resin).

When an emulsion is used as the adhesive compound, the emulsion may be obtained by synthesis. For example, the emulsion can be obtained by polymerizing resin monomers with a method such as emulsion polymerization or suspension polymerization.

The glass transition temperature (Tg) of the adhesive compound can be easily controlled in the heating step of the recording method according to the embodiment, and is preferably −10° C. to 100° C. and more preferably −10° C. to 70° C. from the viewpoint of easy configuration of an apparatus.

The adhesive composition contains the above-described materials and thus can exhibit adhesion properties by heating it. In addition, as the adhesive compound, a compound which exhibits adhesion properties by a reaction may be used. In this case, the adhesive composition may optionally contain additive such as a polymerization initiator, a reaction aid, an antioxidant, an ultraviolet absorber, and a filler. Furthermore, the adhesive composition may contain a pressure-sensitive adhesive (adhesive liquid) which exhibits adhesive properties by applying pressure thereto. Examples of the pressure-sensitive adhesive include materials having a structure in which an adhesive is sealed in a very small capsule. The adhesive composition may be a mixture of two or more kinds among the above-described examples.

4.2. Physical Properties of Adhesive Composition

The adhesive composition is deposited with an ink jet method so as to be attached onto a recording medium. Examples of conditions determining whether the adhesive composition can be applied to an ink jet method include viscosity. The viscosity of the adhesive composition at 20° C. is preferably 2 mPa·s to 10 mPa·s and more preferably 3 mPa·s to 5 mPa·s. When the viscosity of the adhesive composition at 20° C. is within the above-described range, an appropriate amount of the adhesive composition can be ejected from nozzles and the deflection and scattering of the adhesive composition can be further reduced, which is desirable for the application of the embodiment to an ink jet method.

In order to adjust the viscosity, the adhesive composition may contain, for example, a surfactant, a polyvalent alcohol, an organic solvent, and a resin component. In addition, the adhesive composition may be aqueous or solvent-based (non-aqueous).

Since the surfactant, the polyvalent alcohol, the organic solvent, the resin component, and water which may be included in the adhesive composition are the same as in a known ink composition or as in the white ink described below, the description thereof will not be repeated.

The viscosity of the adhesive composition can be appropriately adjusted by changing the composition, kind, and composition ratio of the components.

The adhesive composition can exhibit adhesive properties after being attached onto a recording medium or an ink composition. In addition, the adhesive force (adhesion) between a surface formed of the adhesive composition and metallic foil formed on a sheet described below is set to be greater than that between metallic foil and the sheet on which the metallic foil is formed.

5. Sheet on which Metallic Foil is Formed

Examples of the sheet on which metallic foil is formed include those obtained by forming a glossy film, which is formed of one kind or an alloy of two or more kinds selected from a group consisting of aluminum, silver, gold, platinum, nickel, chromium, tin, zinc, indium, titanium, and copper, on a surface of a plastic film (sheet) formed of, for example, polyethylene terephthalate (PET), polybutylene terephthalate (PBT), polycarbonate, polyethylene naphthalate, polyester, polyethylene, polypropylene, acrylic resins, polystyrene, polyvinyl chloride, polyvinyl acetate, polyvinyl alcohol, polyether ether ketone, polyamide, polyestersulfone, polydiacetate, triacetate, or polyimide.

Such a sheet on which metallic foil is formed can be obtained by forming a metallic foil on a surface of the sheet by vapor deposition, sputtering, or the like. In addition, a commercially available product may be used as the sheet on which metallic foil is formed. Furthermore, regarding the sheet on which metallic foil is formed, in order to facilitate the peeling of the metallic foil from the sheet, the surface (interface) of the sheet may be treated; or a layer for facilitating the peeling may be provided between the metallic foil and the sheet. In the embodiment, as described below, a sheet on which an aluminum-deposited film is formed is used.

6. Heating Device

In the embodiment, when the metallic foil is transferred onto a fabric, a heating device (for example, a hot press machine) is used. The heating device includes a support which supports a fabric; and a heating plate which is disposed opposite the support. The material of the heating plate is not particularly limited, but examples thereof include metals and ceramics. In the embodiment, the surface temperature of the heating plate is set to 150° C. A fabric is placed on the support and the sheet on which metallic foil is formed is placed thereon. Then, the heating plate is pressed against the support for heating and pressing (heat press method).

The heating device is not limited to a hot press machine, and an iron, a soldering iron, or the like may be used.

Textile Printing Method

Figure 1:
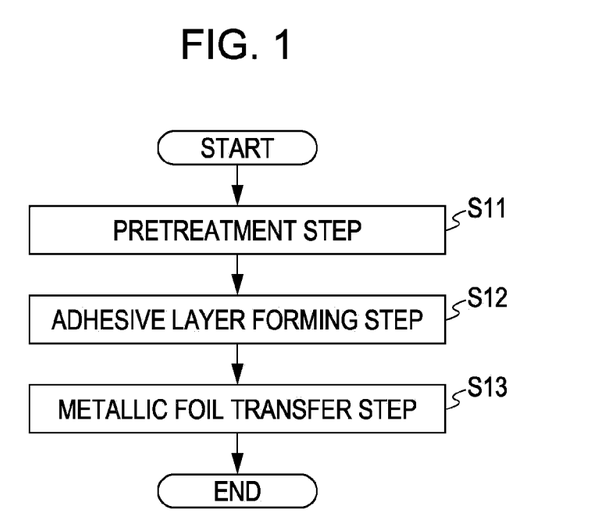
FIG. 1 is a flowchart illustrating the flow of a textile printing method according to a first embodiment of the invention.
Figure 2:
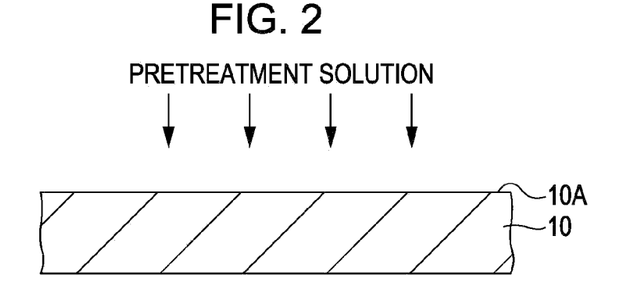
FIG. 2 is a schematic diagram illustrating the pretreatment step of the first embodiment.
Figure 3:
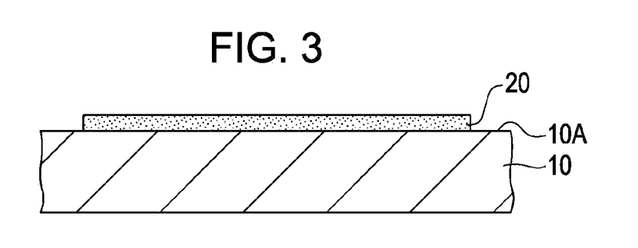
FIG. 3 is a schematic diagram illustrating the adhesive layer forming step of the first embodiment.
Figure 4:
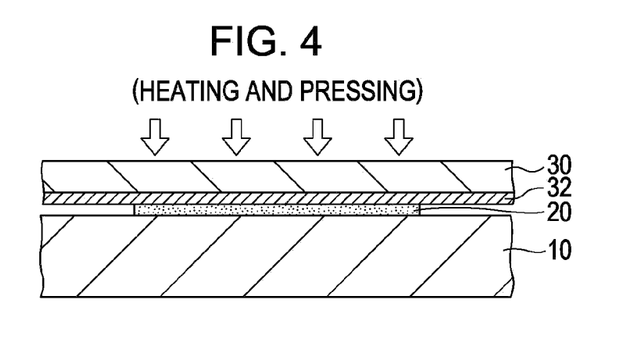
FIG. 4 is a schematic diagram illustrating the metallic foil transfer step of the first embodiment.
Figure 5:
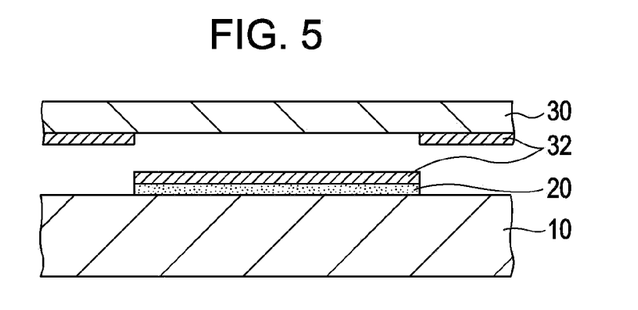
FIG. 5 is a schematic diagram illustrating a state where the metallic foil transfer step of the first embodiment is finished.

FIG. 1 is a flowchart illustrating the flow of a textile printing method according to the first embodiment, and FIGS. 2 to 5 are schematic diagrams illustrating the respective steps of the first embodiment (FIG. 1). FIG. 2 is a schematic diagram illustrating the pretreatment step; FIG. 3 is a schematic diagram illustrating the adhesive layer forming step; and FIG. 4 is a schematic diagram illustrating the metallic foil transfer step. In addition, FIG. 5 is a schematic diagram illustrating a state where the metallic foil transfer step is finished. A recording medium of the embodiment is a fabric 10 (for example, T-shirt).

Hereinafter, the textile printing method according to the first embodiment will be described with reference to the drawings.

Pretreatment Step (FIG. 1: S11)

First, as illustrated in FIG. 2, a printing region on a printing surface 10A of the fabric 10 is coated with a pretreatment liquid containing a polyvalent metal salt. Table 1 shows the composition of the pretreatment liquid used in the embodiment.

TABLE 1

| Component | % By Weight |
|---|---|
| Calcium Nitrate Tetrahydrate | 10 |
| OLFINE E1010 | 0.5 |
| Ion Exchange Water | Balance |

After the fabric 10 is coated with the pretreatment liquid, the pretreatment liquid is dried.

Adhesive Layer Forming Step (FIG. 1: S12)

Next, as illustrated in FIG. 3, an adhesive liquid is ejected with an ink jet method from the head of the ink jet recording apparatus to a metallic image-forming position on the printing surface 10A of the fabric 10 to form an adhesive layer 20. The adhesive layer forming step corresponds to the adhesive liquid ejecting step.

Table 2 shows the composition of the adhesive liquid used in the embodiment.

TABLE 2

| Component | % By Weight |
|---|---|
| MOWINYL 727 (Tg = 5° C.) | 15 |
| OLFINE E1010 | 1 |
| Propylene Glycol | 9 |
| 1,2-Hexanediol | 2 |
| 2-Pyrrolidone | 2 |
| Ion Exchange Water | Balance |

When the adhesive liquid is directly attached onto the printing surface 10A of the fabric 10, the adhesive liquid permeates the fabric 10. However, in the embodiment, since the printing surface 10A is coated with the pretreatment liquid, the adhesive liquid does not permeate and remains on the fabric 10. This is because the adhesive compound (anionic) of the adhesive liquid loses its dispersibility and aggregates when being in contact with the polyvalent metal salt (cationic) of the pretreatment liquid. Metallic Foil Transfer Step (FIG. 1: S13)

Then, as illustrated in FIG. 4, a sheet 30 on which metallic foil 32 (an aluminum-deposited film) is formed is placed such that the metallic foil 32 is disposed opposite the printing surface 10A (in contact with the adhesive layer 20), followed by heating and pressing with a hot press machine (not illustrated). After pressing, when the sheet 30 is peeled off, the metallic foil 32 of the sheet 30 is transferred onto a region of the fabric 10 in which the adhesive layer 20 is formed, as illustrated in FIG. 5.

As described above, in the embodiment, the printing surface 10A of the fabric 10 is coated with the pretreatment liquid before forming the adhesive layer 20 on the fabric 10. By doing so, when the adhesive liquid is ejected onto the fabric 10, the adhesive liquid aggregates on the surface (printing surface 10A) of the fabric 10. In this way, in the embodiment, the permeation of the adhesive liquid to the fabric 10 can be suppressed. Therefore, the metallic foil 32 can be satisfactorily transferred onto the fabric 10 to form a metallic image.

Second Embodiment

In the first embodiment, a layer of the metallic foil 32 (metallic image) is formed on the fabric 10 with the adhesive layer 20 interposed therebetween. However, when the fabric 10 is colored (for example, black), the chromogenic properties of the formed image (metallic image) may deteriorate. Therefore, in a second embodiment of the invention, an undercoat layer is formed to improve the chromogenic properties.

In the second embodiment, white ink is used for forming the undercoat layer. "White Ink" described in this specification represents ink in which the luminance ($L^*$) and chromaticity ($a^*$, $b^*$) of white ink, which is ejected onto photo paper "GLOOSY" (manufactured by Seiko Epson Corporation) at a duty of 100% or higher, satisfies expressions of $70 \leq L^* \leq 100$, $-4.5 \leq a^* \leq 2$, and $-6 \leq b^* \leq 2.5$ when being measured with a spectrophotometer SPECTROLINO (trade name; manufactured by GretagMacbeth Inc.) under specific measurement conditions (D50 light source, field of view: 2°, concentration: DIN_NB, white standard: Abs, filter: No, measurement mode: Reflectance).

Hereinafter, components of the white ink will be described. Since other conditions are the same as in the first embodiment, the description thereof will not be repeated.

1. White Pigment

The white ink according to the embodiment contains a white pigment. Examples of the white pigment include metal oxide, barium sulfate, and calcium carbonate. Examples of the metal oxide include titanium dioxide, zinc oxide, silica, alumina, and magnesium oxide. Among these, titanium dioxide is preferable from the viewpoint of high degree of whiteness.

The average particle size of the white pigment is not particularly limited as long as the ink satisfies the above-described expressions, but is preferably 100 nm to 1000 nm and more preferably 300 nm to 400 nm. When the average particle size is within the above-described range, a printed material having high degree of whiteness can be obtained.

In this specification, the average particle size represents a particle size at a cumulative of 50% in terms of volume and is measured with a light scattering method. The average particle size is measured using, for example, MICROTRAC UPA150 (manufactured by Microtrac Inc.).

The content of the white pigment is preferably 3% by mass to 30% by mass and more preferably 5% by mass to 15% by mass with respect to the total mass of the white ink. When the content is within the above-described range, a printed material having high degree of whiteness can be obtained.

2. Solvent

The white ink of the embodiment contains a solvent. In the case of a so-called aqueous ink which contains 50% by mass or higher of water, the white ink contains water as the solvent. In the case of a non-aqueous ink which substantially does not contain water, the white ink contains an organic solvent such as alcohol as the solvent.

3. Other Components

The white ink according to the embodiment may contain other components. Other components are appropriately determined according to the kind (aqueous or non-aqueous) of the white ink. Hereinafter, as an example of the white ink according to the embodiment, components which can be used in the case of the aqueous ink will be described.

In addition to the above-described components, the white ink according to the embodiment may contain at least one kind selected from alkanediols and glycol ethers.

Preferable examples of the alkanediols include 1,2-alkanediols having 4 to 8 carbon atoms such as 1,2-butanediol, 1,2-pentanediol, 1,2-hexanediol, 1,2-heptanediol, and 1,2 octane diol.

Examples of the glycol ethers include lower alkyl ethers of polyvalent alcohol such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, dipropylene glycol monopropyl ether, triethylene glycol monomethyl ether, triethylene glycol monobutyl ether, and tripropylene glycol monomethyl ether.

The content of at least one kind selected from these alkanediols and glycol ethers can be set to be, for example, 1% by mass to 20% by mass with respect to the total mass of the white ink.

The white ink according to the embodiment may contain a dispersant. The dispersant is not particularly limited, and examples thereof include an anionic polymer dispersant, a nonionic polymer dispersant, an anionic surfactant, and a nonionic surfactant.

In addition to the above-described components, an acetylene glycol-based surfactant or a polysiloxane-based surfactant may be added to the white ink according to the embodiment.

Examples of the acetylene glycol-based surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. In addition, a commercially available product can be used as the acetylene glycol-based surfactant, and examples thereof include OLFINE (trade name) E1010, STG, and Y (all of which are manufactured by Nissin Chemical Co., Ltd.); and SURFYNOL (trade name) 104, 104PG50, 82, 465, 485, and TG (all of which are manufactured by Air Products and Chemicals Inc.). A commercially available product can be used as the polysiloxane-based surfactant, and examples thereof include BYK-347 and BYK-348 (all of which are manufactured by BYK Japan K.K.).

In addition to the above-described components, a polyvalent alcohol may be added to the white ink according to the embodiment. The polyvalent alcohol prevents the white ink from drying and prevents the clogging of ink in the head portion of the ink jet recording apparatus.

Examples of the polyvalent alcohol include ethylene glycol, diethylene glycol, triethylene glycol, polyethylene glycol, polypropylene glycol, propylene glycol, butylene glycol, 1,2,6-hexanetriol, thioglycol, hexylene glycol, glycerine, trimethylolethane, and trimethylolpropane. The content of the polyvalent alcohol can be set to be, for example, 0.1% by mass to 30% by mass with respect to the total mass of the white ink.

The white ink according to the embodiment can be prepared with the same preparation method as that of the pigment ink of the related art using a well-known device of the related art such as a ball mill, a sand mill, an attritor, a basket mill, or a roll mill. During the preparation, it is preferable that coarse particles be removed using a membrane filter, a mesh filter, or the like.

Textile Printing Method

Figure 6:
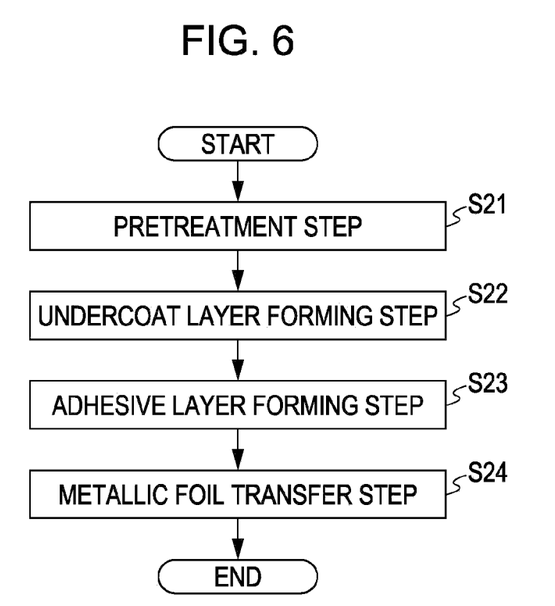
FIG. 6 is a flowchart illustrating the flow of a textile printing method according to a second embodiment of the invention.
Figure 7:
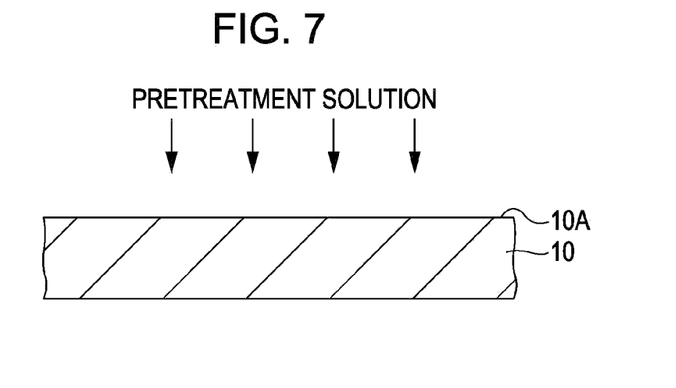
FIG. 7 is a schematic diagram illustrating the pretreatment step of the second embodiment.
Figure 8:
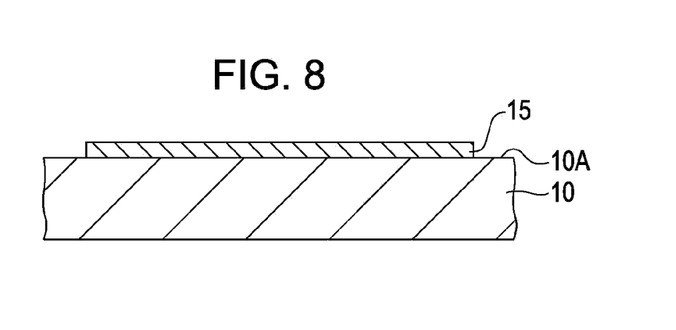
FIG. 8 is a schematic diagram illustrating the undercoat layer forming step of the second embodiment.
Figure 9:
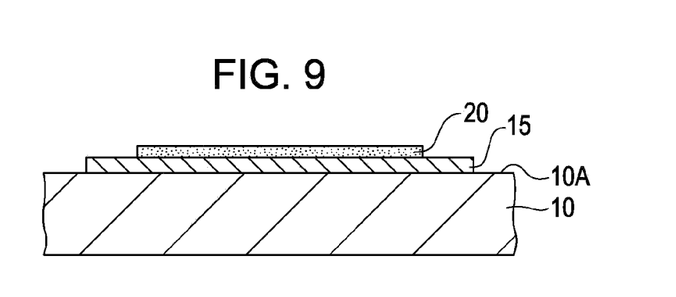
FIG. 9 is a schematic diagram illustrating the adhesive layer forming step of the second embodiment.
Figure 10:
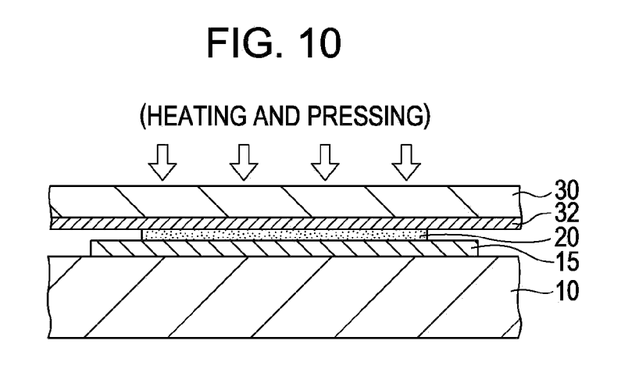
FIG. 10 is a schematic diagram illustrating the metallic foil transfer step of the second embodiment.
Figure 11:
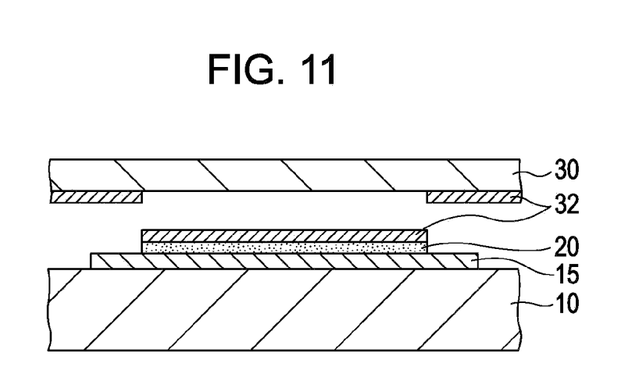
FIG. 11 is a schematic diagram illustrating a state where the metallic foil transfer step of the second embodiment is finished.

FIG. 6 is a flowchart illustrating the flow of a textile printing method according to the second embodiment, and FIGS. 7 to 11 are schematic diagrams illustrating the respective steps of the second embodiment (FIG. 6). FIG. 7 is a schematic diagram illustrating the pretreatment step; FIG. 8 is a schematic diagram illustrating the undercoat layer forming step; FIG. 9 is a schematic diagram illustrating the adhesive layer forming step; and FIG. 10 is a schematic diagram illustrating the metallic foil transfer step. In addition, FIG. 11 is a schematic diagram illustrating a state where the metallic foil transfer step is finished. In the second embodiment, a recording medium is also a fabric 10 (for example, T-shirt), but the fabric 10 of the second embodiment is colored (for example, black).

Hereinafter, the textile printing method according to the second embodiment will be described with reference to the drawings.

Pretreatment Step (FIG. 6: S21)

First, as illustrated in FIG. 7, a printing region on a printing surface 10A of the fabric 10 is coated with a pretreatment liquid containing a polyvalent metal salt. Since the composition of the pretreatment liquid used in the second embodiment is the same as in the first embodiment, the description thereof will not be repeated.

After the fabric 10 is coated with the pretreatment liquid, the pretreatment liquid is dried.

Undercoat Layer Forming Step (FIG. 6: S22)

In this step, the white ink is ejected from the head of the ink jet recording apparatus to the printing surface 10A of the fabric 10 so as to attach the white ink onto a predetermined range of the printing surface 10A at a high duty (for example, a duty of 400%). Since the printing surface 10A of the fabric 10 is coated with the pretreatment liquid, the white ink does not permeate and remains (aggregates) on the fabric 10.

In this way, as illustrated in FIG. 8, a white undercoat layer 15 is formed on the printing surface 10A of the fabric 10.

Adhesive Layer Forming Step (FIG. 6: S23)

Next, as illustrated in FIG. 9, an adhesive liquid is ejected with an ink jet method from the head of the ink jet recording apparatus to a metallic image-forming position on the undercoat layer 15 to form a adhesive layer 20. Since the composition of the adhesive liquid used in the second embodiment is the same as in the first embodiment, the description thereof will not be repeated. In the drawings, the undercoat layer 15 and the adhesive layer 20 are clearly separated from each other. However, in practice, the respective layers may not be clearly separated from each other. For example, when the adhesive liquid which forms the adhesive layer 20 is attached onto the undercoat layer 15 before the white ink which forms the undercoat layer 15 is not sufficiently dried, the white ink and the adhesive liquid may be partially mixed with each other.

Metallic Foil Transfer Step (FIG. 6: S24)

Then, as illustrated in FIG. 10, a sheet 30 on which metallic foil 32 is formed is placed such that the metallic foil 32 is disposed opposite the printing surface 10A (in contact with the adhesive layer 20), followed by heating and pressing (heat press) with a heating plate (not illustrated) of a hot press machine. After pressing, when the sheet 30 is peeled off, the metallic foil 32 of the sheet 30 is transferred onto only a region on the printing surface 10A of the fabric 10 in which the adhesive layer 20 is formed, as illustrated in FIG. 11.

In this way, in the second embodiment, the undercoat layer 15 is formed between the fabric 10 and the adhesive layer 20. In this way, when the undercoat layer 15 is formed, the metallic foil 32 can be satisfactorily transferred. In addition, in the second embodiment, since the undercoat layer 15 is formed, the chromogenic properties of the transferred metallic foil 32 (metallic image) can be improved, irrespective of the color of the fabric 10.

Other Embodiments

The above-described embodiments have been made for easy understanding of the invention, and the invention is not limited thereto. The invention can be modified and enhanced in various ways without departing from the scope thereof as defined in the appended claims.

Transfer of Metallic Foil

In the above-described embodiments, a hot press machine is used for heating and pressing to transfer the metallic foil 32 onto the adhesive layer 20 of the fabric 10. However, the invention is not limited thereto. For example, when the adhesive layer 20 (adhesive liquid) has sufficient adhesion at room temperature, the metallic foil 32 can be transferred by bringing the metallic foil 32 of the sheet 30 into contact with the adhesive layer 20 of the fabric 10 (without heating). In this case, optionally, pressing may be performed using, for example, a press machine or a roller press machine. In addition, when a component of the adhesive liquid is thermoplastic and the adhesive layer 20 exhibits adhesive properties by heat, heating may be performed using an appropriate heating unit. In this case, optionally, pressing may also be performed.

Image

In the above-described embodiments, only a metallic image (image obtained by transferring the metallic foil 32) is formed on the fabric 10, but other images may be formed thereon. For example, color images may be formed on regions other than the metallic image-forming region (in other words, other than the region in which the adhesive layer 20 is formed) using color inks (e.g. cyan, magenta, yellow, and black). Specifically, in the case of the first embodiment, when the adhesive layer forming step (FIG. 1: S12) is performed, color inks may be ejected from the head onto regions of the printing region of the fabric 10 other than the region, in which the adhesive layer 20 is formed, to form color images. In addition, in the case of the second embodiment, when the adhesive layer forming step (FIG. 6: S23) is performed, color inks may be ejected from the head onto regions of the under layer 15 other than the region, in which the adhesive layer 20 is formed, to form color images on the undercoat layer 15.

In addition, color images may be formed on the metallic image. In this case, color images having metallic gloss can be formed.

What is claimed is:

1. A textile printing method comprising:
   coating a printing surface of a fabric with a pretreatment liquid;
   ejecting an adhesive liquid onto the printing surface to form an adhesive layer, after the coating of the printing surface; and
   transferring metallic foil onto the adhesive layer by bringing a sheet, on which the metallic foil is formed, into contact with the adhesive layer,
   wherein the pretreatment liquid for fabric contains at least one kind of polyvalent metal salt or at least one kind of organic acid, and
   the adhesive liquid, which is attached onto the fabric with an ink jet method, contains an adhesive compound.

2. The textile printing method according to claim 1, further comprising ejecting an undercoat ink onto the printing surface, coated with the pretreatment liquid, to form an undercoat layer, before the ejecting of the adhesive liquid.

3. The textile printing method according to claim 2, wherein the undercoat ink is white ink.

4. The textile printing method according to claim 1, wherein the transferring of the metallic foil includes heating the sheet and the fabric.

5. The textile printing method according to claim 4, wherein the heating of the sheet and the fabric is performed with a heat press method.

6. The textile printing method according to claim 1, wherein the adhesive compound further comprises an anionic group.

* * * * *